June 20, 1939.    W. W. FOSTER    2,163,028
CLUTCH ACTUATING DEVICE
Filed Nov. 23, 1935    2 Sheets-Sheet 1
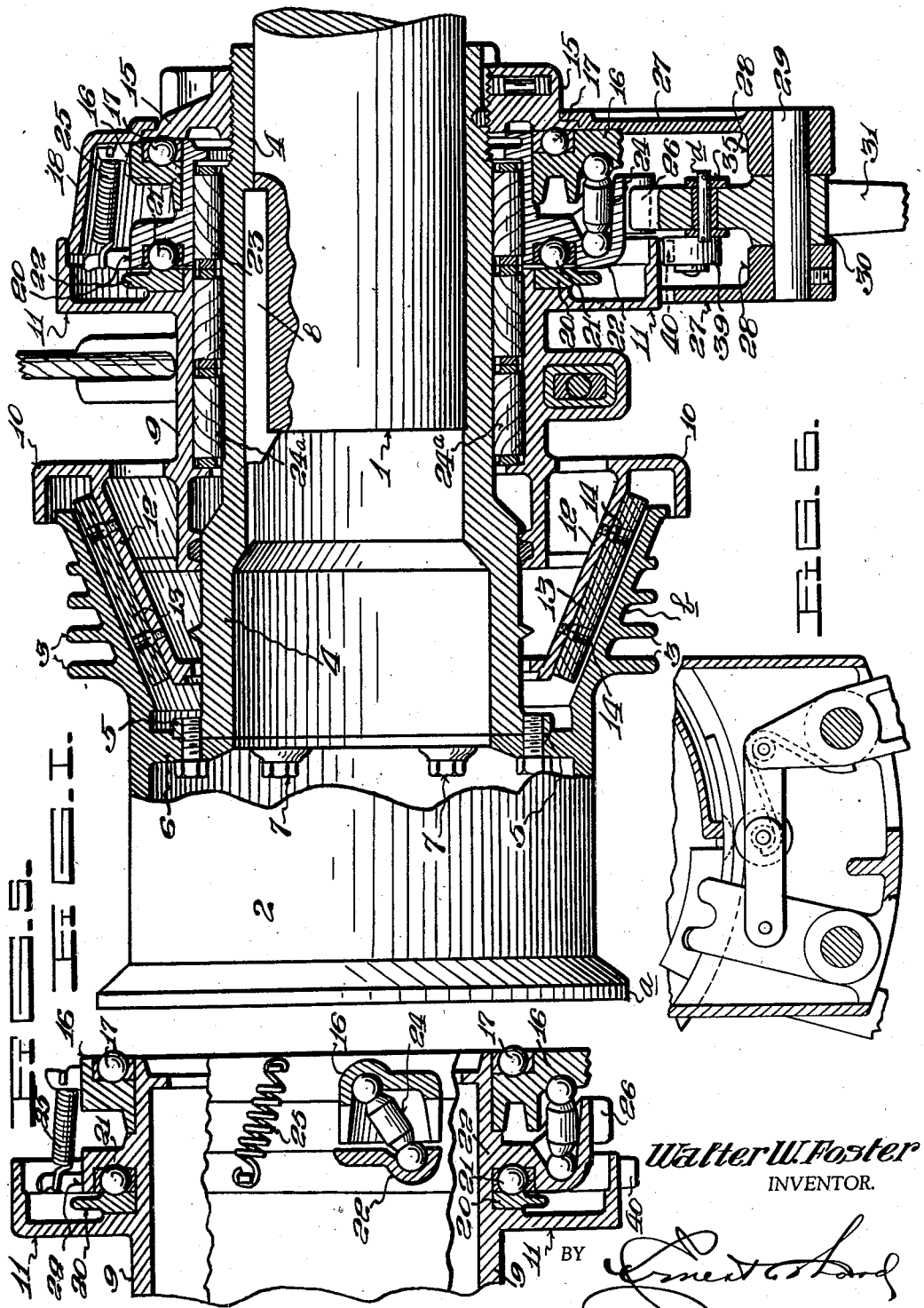
Walter W. Foster
INVENTOR.
BY
ATTORNEY.

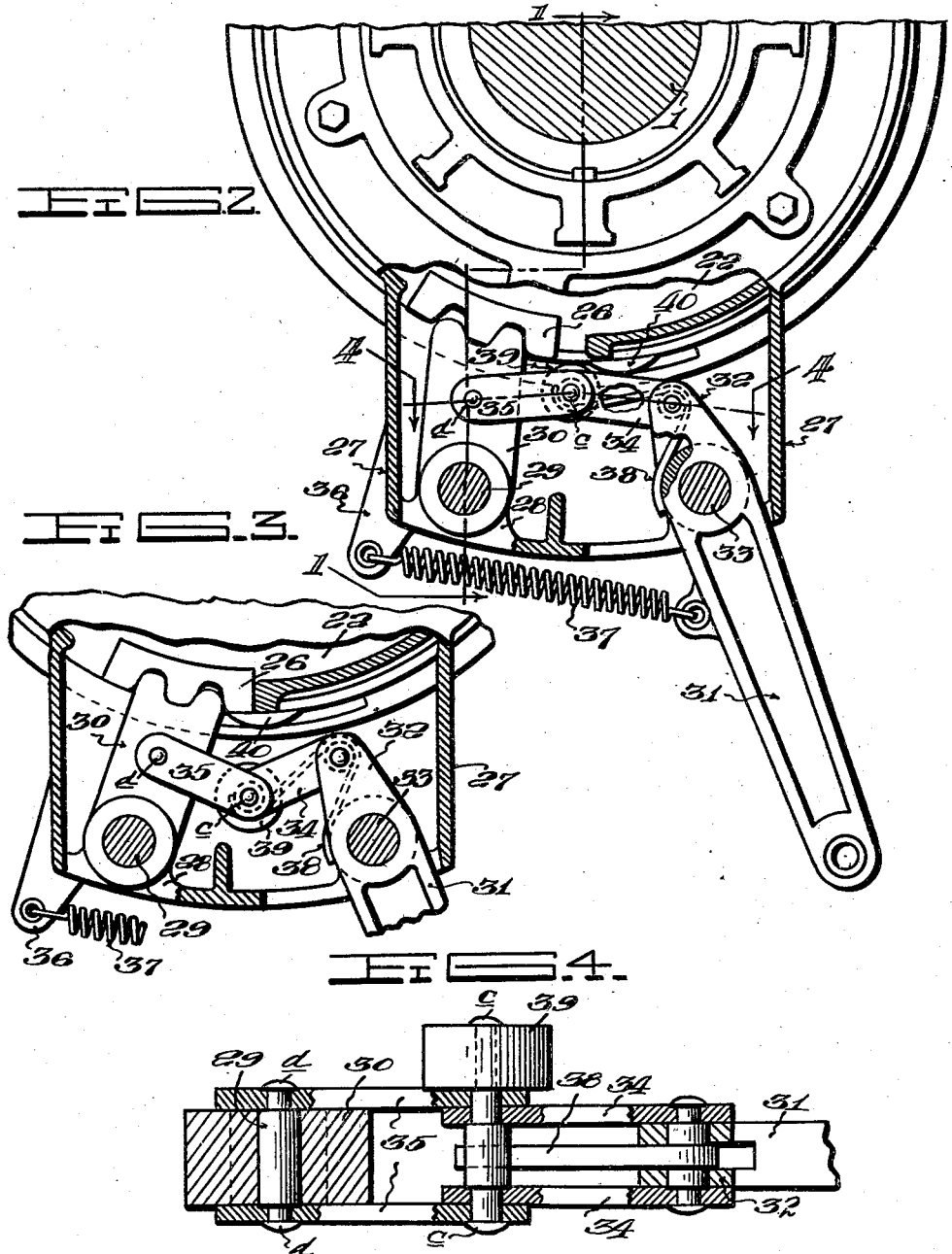

Patented June 20, 1939

2,163,028

UNITED STATES PATENT OFFICE 2,163,028

CLUTCH ACTUATING DEVICE

Walter W. Foster, Wichita Falls, Tex.

Application November 23, 1935, Serial No. 51,277

8 Claims. (Cl. 192—93)

This invention relates to clutches especially of the type employed for controlling casing handling equipment in drilling wells and the invention has particular reference to clutch actuating devices.

The primary object of the invention is to provide automatic means for releasing the engaged parts of a clutch when moved manually or otherwise to engaged or operative position.

Another object of the invention is to provide a clutch control means so constructed as to be peculiarly adaptable for use on equipment ordinarily exposed to much abuse and rough usage, and is therefore not easily damaged and serves its purpose without necessity of any great amount of manual attention.

The invention, while obviously adaptable to other uses, is primarily designed as an improvement upon or an aid in the operation of the Friction control for pull lines described in an application filed by the applicant April 11, 1935, Serial No. 15,919.

With the foregoing objects as paramount, the invention has particular reference to its salient features of construction and arrangements of parts, to become manifest as the description proceeds, taken in connection with the accompanying drawings, wherein:

Figure 1 is a view in longitudinal section, showing the friction clutch or cathead for which the invention is designed to operate, the clutch actuating means being shown on line 1—1 on Figure 2.

Figure 2 is an end view of the clutch or cathead with the invention installed showing the actuating elements in operative position.

Figure 3 is a fragmentary view of the clutch release mechanism of the invention in inoperative position.

Figure 4 is a section view on lines 4—4 on Fig. 2, and;

Figure 5 is an elevational view, partly in section showing the "crowder" mechanism of the clutch or friction cathead.

Figure 6 is a fragmentary view of the condition of the mechanism with the clutch disengaged and in normal position.

Continuing with a more detailed description of the drawings, reference will be made primarily to the construction of the friction cathead. As previously stated, this particular type of clutch has been designed for and is at present in operation on casing handling apparatus for wells.

In Figure 1, the numeral 1 designates the end of a conventional draw-works line shaft. In drilling, this shaft rotates continuously, hence it becomes necessary to provide means other than the customary spool or cathead to allow of rotation counter to the direction of rotation of the shaft. This means is comprised of the drum or spool 2, which has a short outer flange a (Fig. 1) and a tapered inner flange b surrounded by fins 3, serving to cool the flange b since the latter's inner surface functions as a clutch shoe in a manner to be later described.

A sleeve 4 is mounted on the shaft 1 and overreaches its end. A flange 5 is provided on the sleeve 4 to provide a surface to which the internal flange 6 of the spool may be secured by bolts 7. The sleeve 4 is secured to the shaft 1 by means of the key 8.

Surrounding the sleeve 4 is a drum 9, which may be referred to in the present use of the invention as a spinner drum. This drum is provided with flanges 10 and 11. This drum is so constructed that a substantially truncated coneshaped clutch drum 12 is formed integrally with the outside of the flange 10, and which is conformably received by the similarly shaped flange b of the spool 2, which as previously stated, functions as a clutch shoe.

The clutch lining 13 is secured by screws 14 or equivalent means to the outer surface of the clutch drum so that frictional engagement between the lining and shoe b will be possible, when it is desired to rotate the spinner drum 9.

The foregoing description reveals that the friction clutch on which the invention operates is mounted on a constantly revolving shaft and that elements fixed to the shaft afford a clutching surface for a more or less independent element (drum 9), which carries a clutch lining 13. Accordingly to effect rotation of the element or drum 9, it is necessary to move the latter so that the lining 13 carried by flange 12 will engage the inner surface of the flange b. To accomplish this, there is provided a ring 15 (Fig. 1) internally threaded to be received on the end of the sleeve 4. To the left of ring 15 in Figure 1 is provided a second ring 16 and interposed between rings 15 and 16, is a series of ball bearings 17.

The member 18 embraces the ring 16 and affords a housing for the elements operating to axially move the drum 9. This member 18 is stationary and its inner flange underlies the flange 11 of the drum 9 and adjacent this flange is a thrust plate 20 for the balls 21, opposite the companion ball assembly 17.

The inner race for these balls is comprised of the member 22, which as apparent in Figure 1, is separated from the sleeve 4 by roller bearings 23, as is the drum 9, by roller bearing 24a.

Obviously since the bearing race 15 is held against other than rotatable movement, it affords a thrust plate when it is desired to urge the race 22 forward to effect engagement of the clutch elements (13 and b). This displacement (of drum 9) is effected by changing collectively or simultaneously the positions of the thrust pins 24. These pins which have ball or spherical ends, lying in suitable sockets provided therefor in rings 16 and 22 are, when the clutch elements are not engaged, disposed at a variety of relative angles but when the clutch is engaged, these pins must assume a position substantially parallel to the axis of the rotating shaft 1. Such movement or collective displacement of the pins 24 is resisted by a series of springs 25, connecting member 16 to member 22 (Figure 5).

The foregoing description of the clutch which is in greater detail in the pending application identified above, sets forth with sufficient detail a type of clutch for which the invention has been designed to operate.

Accordingly and referring specifically and in detail to the invention, reference is made to Figures 2, 3 and 4. The member 22, referred to as the inner race for bearings 21 is shown as having a gear segment 26 secured thereto or formed thereon. Depending from the stationary member 18 is a housing 27 which encloses or partially encloses the elements of the invention.

The housing 27 is of course also stationary and within the same bosses 28 are formed (Figure 1). These bosses are cored to receive a bearing pin 29 for an arm or operating segment 30. This arm or segment has a toothed upper end which enmeshes the teeth of the gear segment 26.

To actuate the arm 30, an operaitng lever 31 is provided having a bifurcated end 32, pivotally suspended on a pin 33. To the bifurcated end of the arm is connected links 34, these being pivotally joined at c (Figs. 2–4) by links 35, the ends of the latter being pivoted at d to the arm 30.

Affixed to and extending below the housing 27 is an apertured projection 36 (Figs. 2 and 3), to which is secured an end of a spring 37. The opposite end of this spring is connected to the operating lever 31. A leaf spring 38 is disposed under the pivot pin c, over the pin connecting the arm 31 and links 34 and over the pin 33 of the arm. A roller 39 carried on the central pivot c of the links 34 and 35 is urged upward by pressure of spring 38.

The flange 11 of drum 9, as apparent in Figure 5, as well as Figure 2 carries a cam or projection 40 which, when the drum rotates, engages roller 39 when the lever 31 is moved to urge the said roller into the path thereof. This engagement, as will be presently explained, is effective to disengage the clutch elements 13 and b of the device, as explained.

Figure 2 indicates the position of the mechanism while maintaining the clutch members 13 and b in engagement. This position is maintained, against the force of the springs 25 tending to disengage the clutch, and against the force of the spring 37 urging the lever 31 in a clockwise direction, by the continuing application of the force of the operator upon the lever 31, urging it in a counter clockwise direction. Disengagement of the clutch may be effected in either of two ways. The force of the operator may be removed from lever 31, whereupon the springs 25 and 37 will return the mechanism to the position of Figure 6, thus disengaging the clutch, the spring 38 meanwhile maintaining the roller 39 against flange 11. Re-application of the force of the operator upon lever 31 will be effective through linkage 34, 35 and lever 30 to operate the clutch engaging mechanism to again engage the clutch by the movement of lever 31 from the position of Fig. 6 to that of Fig. 2.

Disengagement of the clutch may also be effected by the operation of cam 40, carried by flange 11, striking roller 39 and causing the roller, together with the pin C, to be moved downward from the position shown in Fig. 2 to a point below a line drawn between the pin d and the pin in the bifurcated end of lever el. After reaching this condition, the resistance of the toggle to compression is broken and the roller 39 is further urged downward against the spring 38 by the strength of the springs 25 acting through lever 30 and links 35 until the position shown in Fig. 3 is reached, in which position the clutch is disengaged. Before re-engagement of the clutch may be accomplished, the force of the operator is removed from lever 31 allowing it to move under the action of spring 37 in a clockwise direction from the position of Figure 3 to that of Figure 6, from which the operator may again apply the force to lever 31 to again engage the clutch as described above.

It will be understood that the invention is designed to move an element of a clutch into engagement with a companion element, to set in motion certain machinery and that any structure the definition of which falls within the definition of the present invention as set forth in the appended claims therefor is considered as being anticipated.

What is claimed is:

1. Apparatus for moving the elements of a clutch into and out of operative engagement including in combination with the male and female elements of a clutch; an operaitng arm, means having operative connection with said operating arm and in continuous operative engagement with the male element of said clutch whereby to effect rotation and consequent advancement thereof into operative engagement with said female element, and means carried by said male element to effect retirement of said operating arm to inoperative position to disengage said clutch elements.

2. A clutch operating apparatus including in combination with a clutch element arranged for rotative advancement into engagement with a constantly rotating companion element, an operating lever, means in continuous operative engagement with said first clutch element and having link connection with said lever to be operated thereby to effect partial rotation and consequent advancement of said first clutch element toward its companion element, means normally urging said operating lever toward the operative plane, and means carried by said first clutch element for effecting reverse rotation thereof by contact with the link connection between said means and lever to disengage said clutch elements.

3. In combination with complementary clutch elements arranged for connection and disconnection, apparatus for effecting movement of one element into engagement with its companion element comprising a member in continuous operative engagement with the movable element, an operating lever therefor, means connecting said member and lever capable of movement toward and away from said movable clutch element, means under tension for normally urging said connecting means toward said movable clutch element when said operating lever is actuated to effect engagement of said clutch elements and means carried by said movable clutch element for overcoming the resistance of said tension means, and said connecting means to effect disengagement of said clutch elements.

4. In combination with a clutch provided with a clutch element held against other than rotative movement and having a companion clutch element arranged for axial displacement to effect its engagement with said first element, apparatus for displacing said element including means in continuous operative engagement with said displaceable element, and an operating lever to move the same thereby to move said latter displaceable element to effect axial displacement and consequent engagement thereof with said rotatable clutch element, and spring means for returning said first means to its original inoperative position to effect disengagement of said clutch elements.

5. In combination with a clutch having a continuously rotating element and an element arranged to be rotatably urged into engagement with said first element, means for urging said second element into engagement with and effecting disengagement thereof from said first element, said means including means operating on an axis parallel with that of said second clutch element for indirectly exerting an axial thrust on said latter element, an operating lever having operative connection with said means to effect movement thereof in one direction, and means carried by said second clutch element for returning said operating means and lever to original inoperative position and to effect simultaneously disengagement of said clutch elements.

6. In a clutch comprised of a constantly rotating drum and a second drum movable axially with respect to said first drum and having means therein capable of independent rotation and provided with devices for exerting an axial thrust on said second drum when rotated, means for rotating said independently rotatable means to effect engagement of said drums, and means carried by said second drum for automatically returning said independently rotatable means and its operating means to inoperative position to effect disengagement of said drums.

7. In a clutch control device for friction break-out catheads having a rotatable drum and an axially displaceable drum provided with internal means for exerting a thrust thereagainst, said control device including means in continuous engagement with said internal thrust means and having an operating lever to effect movement thereof to thereby rotate said thrust means to effect engagement of said drums, and means carried by said axially displaceable drum operative to return said thrust means to inoperative position to thereby release said drums from rotating engagement.

8. A control device for break-out catheads comprised of a continuously rotating drum and an axially displaceable drum provided with independently rotatable thrust means for effecting its engagement with said first drum, said control device including means operating to effect slight rotation of said thrust means to effect engagement of said drums, and means carried by said axially displaceable drum for rendering said thrust rotating means inoperative to thereby release said displaceable drum from said continuously rotating drum.

WALTER W. FOSTER.